No. 848,386. PATENTED MAR. 26, 1907.
G. R. McGAHAN.
TREATMENT OF LEAVES.
APPLICATION FILED SEPT. 10, 1906.
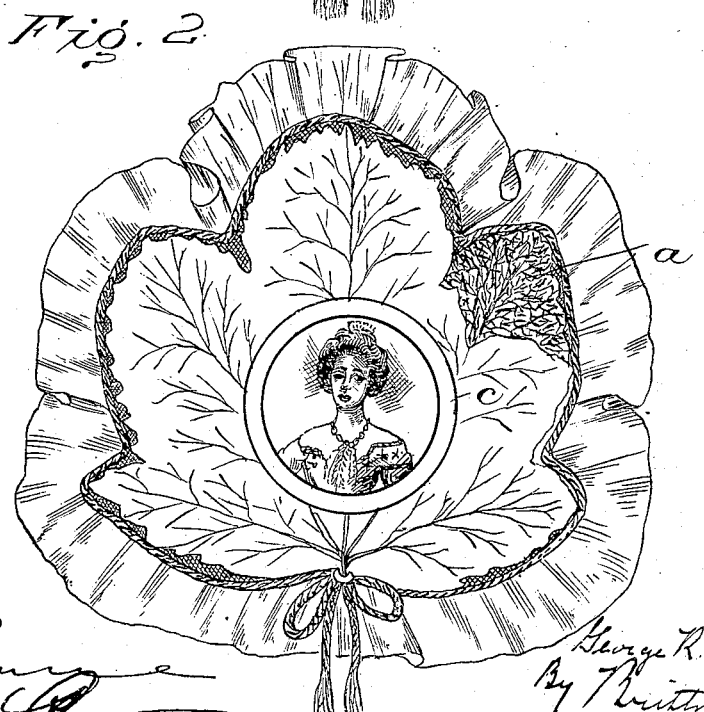
Witnesses
Inventor
George R. McGahan
By Britton & Gray
Attorneys

UNITED STATES PATENT OFFICE.

GEORGE RONALD McGAHAN, OF PAISLEY, SCOTLAND, ASSIGNOR TO JAMES LOGAN BENJAMIN HAMILTON, OF LOS ANGELES, CALIFORNIA.

TREATMENT OF LEAVES.

No. 848,386.     Specification of Letters Patent.     Patented March 26, 1907.

Application filed September 10, 1906. Serial No. 334,003.

*To all whom it may concern:*

Be it known that I, GEORGE RONALD MC-GAHAN, engineer, a subject of the King of Great Britain and Ireland, and a resident of Paisley, Scotland, have invented certain new and useful Improvements in the Treatment of Leaves, of which the following is a specification.

This invention has reference to and comprises improvements in the treatment of leaves to render them suitable for souvenirs, presents, mementos, and as a basis for seasonable greetings, mottoes, figures, or the like.

In order that my said invention may be properly understood, I have hereunto appended one sheet of illustrative drawings, in which—

Figure 1 illustrates the application of my improvements to the preparation of a souvenir, while Fig. 2 shows a leaf adapted as an ornament on a sachet or the like.

In both these views the skeletonizing effect which in practice is produced over the whole of the leaf is only partially indicated at *a*.

Any suitably-prepared leaf may be so engraved, perforated, or partially or wholly skeletonized as to be rendered partly transparent by removing the softer or pulpy portion and leaving the harder or fibrous structure thereof more or less. Any portion may be blocked out and left unskeletonized—as the lettering *b* in Fig. 1 and the ring *c* in Fig. 2—to represent various forms or arrangements of letters, words, figures, shapes of objects, and the like, painted or unpainted. The leaf, as in Fig. 1, may be prepared as a souvenir by itself or it may be arranged with suitable plain or decorated backings or backgrounds of silk or the like, as in Fig. 2, or with cases or covers made of card, paper, or other materials. The leaf is thoroughly dried, preferably under pressure, and may be heated before treatment, or boiling of the leaves will in some cases facilitate the operation.

The method of preparation is as follows: A stencil of the words, figures, designs, or the like which it is desired to produce on the leaf is prepared, and this being laid upon the leaf the exposed portions are acted on by means of a brush or the like, formed of bristles, hairs, fibers, or fine wires, which is struck firmly and repeatedly upon the leaf until the pulpy portion of the leaf is broken up and can be removed. When the whole leaf is to be treated, no stencil will be required. Instead of using a stencil the parts to be protected from the action of the brush may be protected by a coating of strong gum or the like or any suitable varnish which will resist the action of the bristles. In some cases the brush may be made with vacant spaces among the bristles to represent letters or other designs, which would leave corresponding parts of the leaf unaffected by the treatment. The designs when produced may be colored or gilt, and the skeletonized leaves may be mounted in any desired manner, such as on sachets, which may have photographs or pictures added to them, as indicated in Fig. 2.

Tobacco, coffee, or other suitable leaves may be so treated to form advertisements for shop-windows and for many other purposes.

What I claim as my invention, and desire to secure by Letters Patent, is—

1. The process of preparing skeletonized natural leaves by subjecting them to the beating action of a brush-like implement to break up and remove the pulpy portion substantially as described.

2. The process of preparing skeletonized natural leaves showing words, designs or the like by protecting portions of same and subjecting the remainder to the beating action of a brush-like implement to break up and remove the pulpy portions substantially as described.

In testimony whereof I have signed my name to this specification in the presence of two subscribing witnesses.

GEORGE RONALD McGAHAN.

Witnesses:
    ROBERT CLEGHORN THOMSON,
    WILLIAM RUTHERFORD.